United States Patent [19]

Merbler

[11] Patent Number: 4,929,217
[45] Date of Patent: May 29, 1990

[54] VARIABLE SPEED PULLEY
[75] Inventor: Rudolph Merbler, Fairport, N.Y.
[73] Assignee: Xerox Corporation, Stamford, Conn.
[21] Appl. No.: 387,738
[22] Filed: Aug. 1, 1989
[51] Int. Cl.⁵ .......................................... F16H 11/02
[52] U.S. Cl. ...................... 474/54; 474/19; 474/190
[58] Field of Search .............. 474/11, 12, 17, 19, 474/20, 21, 69, 70, 54, 190, 94, 38, 42, 43

[56] References Cited

U.S. PATENT DOCUMENTS

| | | | |
|---|---|---|---|
| 1,442,899 | 1/1923 | Neenan | 474/190 X |
| 2,198,831 | 4/1940 | Moyer | 474/190 X |
| 2,283,392 | 5/1942 | Shadrick | 474/21 |
| 2,453,580 | 11/1948 | Lusk | 474/20 |
| 2,651,208 | 9/1953 | Karig | 474/19 |
| 2,900,834 | 8/1959 | Bessette | 474/19 |
| 2,951,388 | 9/1960 | Tacquet | 474/19 |
| 3,996,811 | 12/1976 | Reese | 474/19 X |
| 4,095,479 | 6/1978 | Lundberg | 474/19 X |
| 4,482,340 | 11/1984 | Kovaleski | 474/190 X |
| 4,738,651 | 4/1988 | Favache et al. | 474/19 |

Primary Examiner—Thuy M. Bui
Attorney, Agent, or Firm—H. Fleischer; J. E. Beck; R. Zibelli

[57] ABSTRACT

A variable speed pulley adapted to be mounted on a shaft has a resilient member with an exterior surface adapted to support a belt thereon. The compression of the resilient member is controlled to adjust the location of the exterior surface of the resilient member. The effective diameter of the pulley increases or decreases as a function of the location of the exterior surface of the resilient member.

11 Claims, 2 Drawing Sheets

VARIABLE SPEED PULLEY

This invention relates generally to a variable speed pulley, and more particularly concerns a pulley having provisions for adjusting the width of the groove therein to control the effective belt diameter.

Typically, timing belts, pulleys and cable drives are frequently used to drive optical devices, printers and typewriter heads. It is desirable to use a variable speed drive pulley having a V-shaped groove. Such a pulley has to e capable of driving print heads and type writer heads with stepper motors. These drives require constant timing and accuracy. Many mechanical rotating devices can be driven by a friction drive variable speed pulley and a light duty cable or the equivalent. Numerous devices have been proposed. The following disclosures appear to be relevant:

U.S. Pat. No. 2,283,392, Patentee: Shadrick, Issued: May 19, 1942.

U.S. Pat. No. 2,453,580, Patentee: Lusk, Issued: Nov. 9, 1948.

U.S. Pat. No. 2,651,208, Patentee: Karig, Issued: Sept. 8, 1953.

U.S. Pat. No. 2,900,834, Patentee: Bessette, Issued: Aug. 25, 1959.

U.S. Pat. No. 2,951,388, Patentee: Tacquet, Issued: Sept. 6, 1960.

The relevant portions of the foregoing disclosures may be briefly summarized as follows:

U.S. Pat. No. 2,283,392 discloses a V-shaped, variable speed drive pulley which is cam operated by a motor driven device. The pulley's rate of rotation is modified by adjusting the effective belt diameter that exists between the driving and driven elements of the pulley members. The effective belt diameter is adjusted by adjusting the space between opposed disks defining the sides of the V-shaped pulley.

U.S. Pat. No. 2,453,580, describes a V-type drive pulley having a fixed half of the pulley mounted on a hollow shaft. A screw is used to move the movable half of the pulley to adjust the spacing between the fixed and movable halves of the pulley.

U.S. Pat. No. 2,651,208 discloses a pulley used for variable speed transmissions which transfers power between a V-type pulley arrangement and a corresponding belt driver. The pulley is mounted rotatably on a drive shaft and has a frictional brake.

U.S. Pat. No. 2,900,834 describes a V-shaped, automatic variable speed pulley used to deliver a driving action and to permit freedom for oscillating movement. The pulley halves are axially displaceable towards one another.

U.S. Pat. No. 2,951,388 discloses a V-grooved pulley in which the opposed side walls of the groove are moved symmetrically toward and away from each other on either side of a fixed transverse plane. These wall are separated automatically the belt tension and urged toward one another by a return spring.

In accordance with one aspect of the present invention, there is provided a variable speed pulley adapted to be mounted on a shaft. The pulley includes a resilient member having an exterior surface adapted to support a belt thereon. Means are provided for controlling the compression applied on the resilient member to adjust the the position of the exterior surface of the resilient member to thereby increase or decrease the pulley diameter.

Other features of the present invention will become apparent as the following description proceeds and upon reference to the drawings, in which.

While the present invention will hereinafter be described in connection with various embodiments thereof, it will be understood that is is not intended to limit the invention to these embodiments. On the contrary, it is intended to cover all alternatives, modifications and equivalents as may be included within the spirit and scope of the invention as defined by the appended claims.

Figure 1:
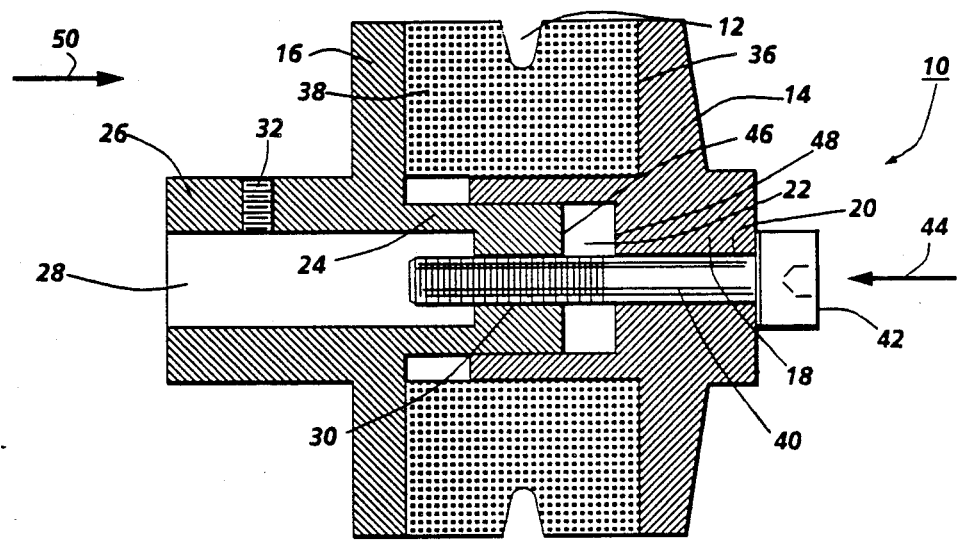
FIG. 1 is a schematic, elevational view showing the pulley of the present invention with a V-groove having a minimum diameter.
Figure 2:
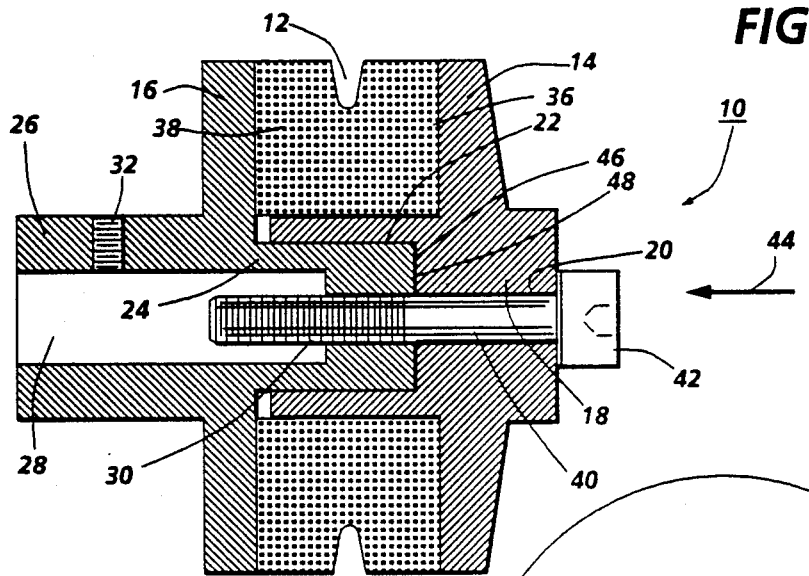
FIG. 2 is a schematic, elevational view showing the pulley of the present invention with a V-groove having a maximum.

Turning initially to FIGS. 1 and 2, there is shown one embodiment of the pulley of the present invention, indicated generally by the reference numeral 10. FIGS. 1 and 2 depict pulley 10 with a V-groove 12 adapted to receive a V-shaped belt. FIG. 1 shows the V-shaped groove 12 having a maximum width. When V-groove 12 is of maximum width, the effective diameter of the pulley is a minimum. As shown, pulley 10 has a pair of movable plates or flanges 14 and 16. Flange 14 extends radially outwardly from cylindrical portion 18. Cylindrical portion 18 has a through hole 20 extending along the longitudinal axis and intersecting with a bore 22. Bore 22 extends along the longitudinal axis of cylindrical portion 18. Plate 16 extends radially outwardly from cylindrical portions 24 and 26. Cylindrical portion 24 is mounted slidably in bore 22 and adapted to telescope therein along the longitudinal axis thereof. Cylindrical portion 26 has a bore 28 therein which extends partially into cylindrical portion 24. Bore 28 extends along the longitudinal axis of cylindrical portion 26 and cylindrical portion 24. A threaded hole 30 extends along the longitudinal axis of cylindrical portion 24 and intersects bore 28. Another threaded hole 32 is located in the wall of cylindrical portion 26 and extends in a direction substantially normal to the longitudinal axis thereof. With continued reference to FIG. 1, when cylindrical portion 24 is mounted in bore 22 of cylindrical portion 18, plates 14 and 16 define a ring shaped opening 36 having a U-shaped cross section. Opening 36 is adapted to receive a resilient ring 38. A bolt 40 is in threaded engagement with threaded hole 30. The head 42 of bolt 40 engages cylindrical portion 18. Resilient ring 38 is shown in FIG. 1 in the fully uncompressed condition. In this condition, V-groove 12 is of a maximum width. The pulley will have the smallest effective diameter and a belt placed in V-groove 12 will also have the smallest effective diameter under these conditions. The effective diameter of the belt determines rotational speed of the pulley and corresponds to the distance between driven and driving pulley at the belt and pulley contact point. For a constant size belt, the width of the V-groove determines the belt and pulley contact point. Thus, as the V-groove width decreases the effective diameter of the belt increases, i.e. the point of contact on the belt and pulley for the driven and drive pulleys moves further apart. The width of V-groove 12 is decreased by compressing resilient ring 38. Resilient ring 38 is compressed by rotating bolt 40 in a clockwise direction. This advances plate 14 in the direction of arrow 44. As plate 14 advances in the direction of arrow 44, it compresses resilient ring 38 decreasing the width of V-groove 12.

Turning now to FIG. 2, FIG. 2 depicts resilient ring 38 fully compressed with V-groove 12 having a minimum width. In the fully compressed condition, end 46 of cylindrical portion 24 contacts bottom 48 of bore 22. The effective diameter of the belt is increased as the width of V-groove 12 has decreased.

Figure 3:
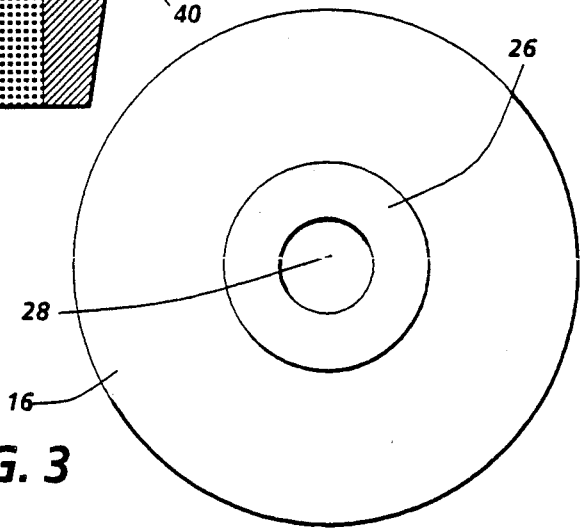
FIG. 3 is a side elevational view of the pulley depicted in FIGS. 1 and 2.

Referring to FIG. 3, FIG. 3 illustrates the side elevational view of pulley 10 when viewed in the direction of arrow 50 (FIG. 1). As shown, plates 14 and 16 are circular with cylinder 26 extending in a direction substantially normal to the surface of plate 16. The longitudinal axis of plate 16 is substantially co-linear with the longitudinal axis of cylindrical portion 26 and that of bore 28.

Figure 4:
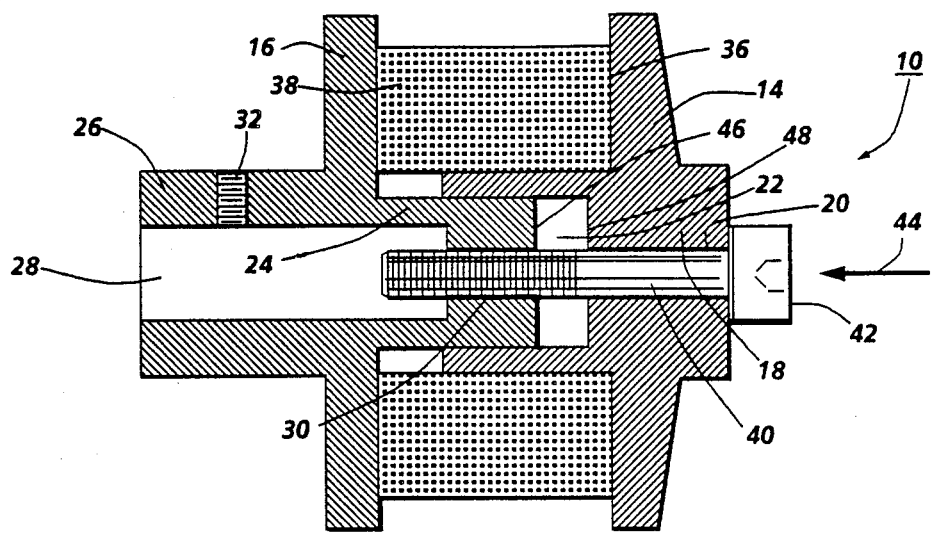
FIG. 4 is a schematic, elevational view showing another embodiment of the pulley of the present invention without the V-groove having a minimum diameter.
Figure 5:
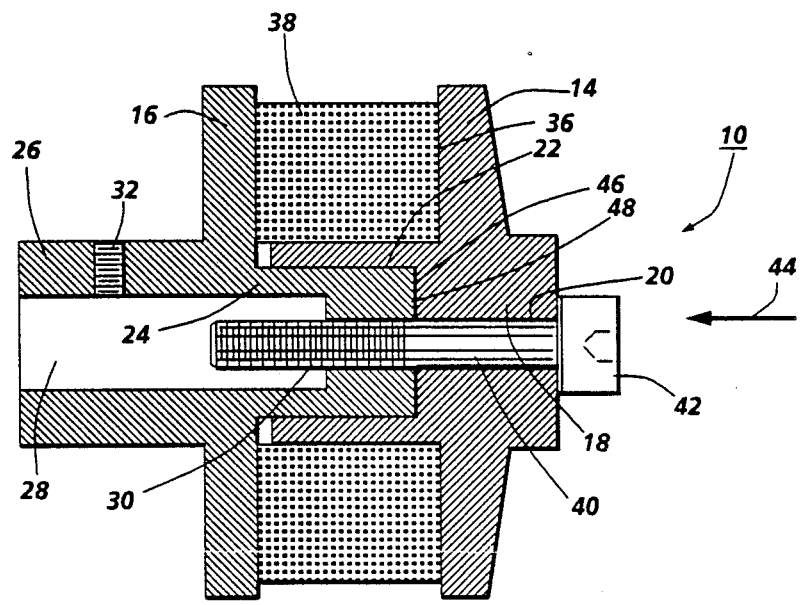
FIG. 5 is a schematic, elevational view showing the pulley of the present invention without the V-groove having a maximum diameter.

FIGS. 4 and 5 depict another embodiment of pulley 10. This embodiment of the pulley is adapted to have a flat belt mounted on the exterior surface of resilient ring 38 between plates 14 and 16. There is no V-shaped groove in resilient ring 38. FIG. 4 illustrates resilient ring 38 in a substantially uncompressed condition. This condition corresponds to the condition depicted in FIG. 1 for the embodiment having a V-shaped groove in the resilient ring. As bolt 40 is rotated in a clockwise direction, plates 14 moves in the direction of arrow 44 compressing resilient ring 38. As resilient ring 38 is compressed, the exterior surface thereof between plates 14 and 16 moves radially outwardly increasing the diameter of pulley 10. FIG. 5 shows resilient ring 38 in a maximum compressed condition corresponding to the condition depicted in FIG. 2 for the embodiment having a V-shaped groove in the resilient ring. Thus, FIGS. 4 and 5 depict an embodiment of the pulley of the present invention for supporting a flat belt. In FIG. 4, the pulley has a minimum effective diameter while in FIG. 5 the pulley has a maximum effective diameter.

Pulley 10, exclusive of resilient ring 38, is made preferably from a metal or plastic material. Resilient ring 38 is made preferably from an elastomeric material. By way of example, resilient ring 38 may be molded or cast from a cross linked urethane material having a Shore A hardness ranging from about 60 to about 80 durometers. When the pulley is adapted to support flat belts on the exterior surface of the resilient ring, lateral grooves such as a fine straight knurl may be incorporated therein to provide greater friction between the flat belt and the exterior surface of the resilient ring. Furthermore, when the resilient ring is compressed, the periphery of the resilient ring becomes crowned to provide better tracking for flat belts. When two variable speed pulleys are used, i.e. one on the drive shaft and other on the driven shaft, a wider latitude speed control is achieved. The size of the pulleys typically vary from ½ inch to 3 inches or greater, depending on the application.

In recapitulation, it is apparent that the pulley of the present invention has a resilient member positioned between a pair of spaced plates mounted movably relative to one another. The exterior surface of resilient member is adapted to support a belt. As the plates are move toward one another, the resilient member is compressed and the effective diameter of the pulley increases. The rotational speed of the pulley is a function of the effective belt diameter. Thus, by adjusting the compression of the resilient member, the pulley rotational speed is regulated.

It is, therefore, apparent that there has been provided in accordance with the present invention, a variable speed pulley that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all alternatives, modifications and variations as fall within the spirit and broad scope of the appended claims:

I claim:

1. A variable speed pulley adapted to be mounted on a shaft, including:
   a resilient member adapted to be located on the shaft and having an exterior surface adapted to support a belt thereon with the distance between the shaft center and the exterior surface of the resilient member corresponding to the pulley diameter; and
   means for controlling the compression of said resilient member to adjust the position of the exterior surface of said resilient member to thereby increase or decrease the pulley diameter.

2. A pulley according to claim 1, wherein said controlling means includes a member adapted to be positioned on the shaft and defining an opening adapted to have said resilient member mounted therein, said member being adjustable to vary the size of the opening so as to adjust the compression applied on said resilient member to set the pulley diameter.

3. A pulley according to claim 2, wherein said member includes:
   a first member; and
   a second member cooperating with said first member to define a U-shaped opening adapted to receive said resilient member therein.

4. A pulley according to claim 3, wherein said first member and said second member are movable relative to one another to vary the size of the U-shaped opening to adjust the compression applied on said resilient member.

5. A pulley according to claim 4, wherein said controlling means includes means, operatively associated with said first member and said second member, for moving said first member and said second member relative to one another.

6. A pulley according to claim 5, wherein said resilient member has a groove therein adapted to receive a belt.

7. A pulley according to claim 6, wherein said first member and said second member are mounted slidably relative to one another.

8. A pulley according to claim 7, wherein said moving means includes a threaded member in threaded engagement with said second member and having a flanged portion at one end thereof contacting said first member so that rotation of said threaded member slides first member and said second member relative to one another.

9. A pulley according to claim 8, wherein said second member includes an aperture therein adapted to be interfit on the shaft.

10. A pulley according to claim 9, wherein said first member and said second member are adapted to telescope relative to one another.

11. A pulley according to claim 10, wherein the groove in said resilient member is V-shaped.

* * * * *